US009219976B2

United States Patent
Isobe et al.

(10) Patent No.: US 9,219,976 B2
(45) Date of Patent: Dec. 22, 2015

(54) PRIVATE BRANCH EXCHANGE SYSTEM, PRIVATE BRANCH EXCHANGE SERVER, AND COMMUNICATION METHOD

(71) Applicant: NTT DOCOMO, INC., Tokyo (JP)

(72) Inventors: Shin-ichi Isobe, Tokyo (JP); Katsutoshi Nishida, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/394,746

(22) PCT Filed: Apr. 18, 2013

(86) PCT No.: PCT/JP2013/061511
§ 371 (c)(1),
(2) Date: Oct. 16, 2014

(87) PCT Pub. No.: WO2013/161671
PCT Pub. Date: Oct. 31, 2013

(65) Prior Publication Data
US 2015/0072695 A1 Mar. 12, 2015

(30) Foreign Application Priority Data

Apr. 25, 2012 (JP) ................................. 2012-100276

(51) Int. Cl.
*H04W 40/00* (2009.01)
*H04W 4/00* (2009.01)
(Continued)

(52) U.S. Cl.
CPC ................ *H04W 4/005* (2013.01); *H04W 4/08* (2013.01); *H04W 4/20* (2013.01); *H04W 8/26* (2013.01); *H04W 28/0289* (2013.01); *H04W 76/023* (2013.01)

(58) Field of Classification Search
CPC ......... H04W 4/005; H04W 4/08; H04W 8/26; H04W 28/0289; H04W 76/023; H04W 4/20
USPC ......................................................... 455/445
See application file for complete search history.

(56) References Cited

U.S. PATENT DOCUMENTS

| 2012/0063464 A1* | 3/2012 | Mehta | ................... H04W 28/02 370/401 |
| 2012/0166668 A1* | 6/2012 | Mathews | ............ H04L 12/2812 709/231 |

FOREIGN PATENT DOCUMENTS

| WO | 2004/032536 A2 | 4/2004 | |
| WO | WO 2004032536 A2 * | 4/2004 | .............. H04W 4/02 |

OTHER PUBLICATIONS

Development of Office Link System to Realize FOMA Internal Line Connections, Sejji Koga, Manabu Fujita, Massaru, Tokohara, Toshinori, Tanaka.*

(Continued)

*Primary Examiner* — Tanmay Shah
(74) *Attorney, Agent, or Firm* — Osha Liang LLP

(57) ABSTRACT

A private branch exchange system capable of enabling radio communication terminals belonging to an extension group to perform device-to-device direct communication (D2D communication) by using a radio access network such as LTE. A private branch exchange server 300 includes a transition trigger detection unit 310 configured to detect a trigger for a transition to the direct communication, an extension group list retention unit 320 configured to retain an extension group list containing an identifier of the radio communication terminal belonging to the extension group, a subgroup selection unit 330 configured to select a certain subgroup from the extension group list, and a direct communication command unit 340 configured to send permission information on the direct communication and configuration information on a communication environment necessary for the direct communication to the radio communication terminal contained in the subgroup selected by the subgroup selection unit 330.

5 Claims, 4 Drawing Sheets

(51) Int. Cl.
　　*H04W 4/20*　　(2009.01)
　　*H04W 76/02*　　(2009.01)
　　*H04W 8/26*　　(2009.01)
　　*H04W 28/02*　　(2009.01)
　　*H04W 4/08*　　(2009.01)

(56) References Cited

OTHER PUBLICATIONS

International Search Report for corresponding International Application No. PCT/JP2013/061511, mailed May 21, 2013 (1 page).

Written Opinion for corresponding International Application No. PCT/JP2013/061511, mailed May 21, 2013 (3 pages).

S. Koga et al; "FOMA Naisen Setsuzoku o Jitsugen suru Office Link System no Kaihatsu (Development of Office Link System to Realize FOMA Internal Line Connections);" NTT DoCoMo Technical Journal, vol. 17, No. 4; pp. 31-36; Jan. 2010 (15 pages).

NTT DOCOMO; "Office Link;" 2012; http://www.docomo.biz/html/service/officelink/ (8 pages).

B. Bertenyi; "Key drivers for LTE success: Services Evolution;" 3GPP Seminar; LTE Asia; Sep. 6, 2011 (15 pages).

* cited by examiner

| EXTENSION GROUP |
| --- |
| TOKYO HEAD OFFICE |
| OSAKA BRANCH OFFICE |
| HIROSHIMA BRANCH OFFICE |
| FUKUOKA BRANCH OFFICE |

(b)

FUKUOKA BRANCH OFFICE

| USER NAME | TELEPHONE NUMBER |
| --- | --- |
| A | 090-1234-5678 |
| B | 090-2345-6789 |
| C | 080-1111-2222 |
| D | 080-3333-4444 |
| ⋮ | |

PRIVATE BRANCH EXCHANGE SYSTEM, PRIVATE BRANCH EXCHANGE SERVER, AND COMMUNICATION METHOD

TECHNICAL FIELD

The present invention relates to a private branch exchange system, a private branch exchange server, and a communication method for providing a communication service to a radio communication terminal which is capable of executing direct communication with another radio communication terminal without involving a radio access network and which belongs to an extension group.

BACKGROUND ART

There is conventionally known a method of using a radio access network (e.g., UTRA (3G), E-UTRA (LTE), or GERAN (2G)) managed by a telecommunications carrier to provide a so-called extension service which is a communication service between radio communication terminals (sometimes abbreviated as terminals hereinbelow) belonging to a particular entity such as a company (e.g., Non-patent document 1). Such an extension service enables terminals belonging to a particular entity, i.e., an extension group, to communicate with each other via a private branch exchange (PBX) server deployed on a network connected to the radio access network.

Further, in recent years, so-called Device-to-Device (D2D) communication is being discussed by 3GPP. In D2D communication, a radio communication terminal performs direct communication with another communication terminal without involving a radio base station (for example, Non-patent document 2). Such D2D communication does not involve a radio base station or a network apparatus, and therefore can enhance the possibility that the terminal can communicate even in a case where the above private branch exchange server has a failure or congestion.

PRIOR ART DOCUMENT

Non-Patent Document

Non-patent document 1: "Office Link," 2012, NTT DOCOMO, Internet URL: http://www.docomo.biz/html/service/officelink/

Non-patent document 2: "Key drivers for LTE success: Services Evolution," September 2011, 3GPP, Internet URL: http://www.3gpp.org/ftp/Information/presentations/presentations_2011/2011_09_LTE_Asia/2011_LTE-Asia_3GPP Service_evolution.pdf

SUMMARY OF THE INVENTION

However, the conventional extension service described above has the following problem. Specifically, even in a case where multiple terminals belonging to the same extension group are located within a certain distance and are capable of D2D communication, normal communication within the extension group always involve the private branch exchange server. For this reason, the extension cannot be used if the private branch exchange server has a failure or congestion.

Thus, the present invention has been made in view of such circumstances, and has an objective of providing a private branch exchange system, a private branch exchange server, and a communication method capable of enabling radio communication terminals belonging to an extension group to perform device-to-device direct communication (D2D communication) by using a radio access network such as LTE.

A first feature of the present invention is summarized as a private branch exchange system including: a radio communication terminal capable of executing direct communication with another radio communication terminal without involving a radio access network; and a private branch exchange server configured to provide a communication service via the radio access network to the radio communication terminal belonging to an extension group. Here, the private branch exchange server includes a transition trigger detection unit configured to detect a trigger for a transition to the direct communication, a list retention unit configured to retain an extension group list containing an identifier of the radio communication terminal belonging to the extension group, a subgroup selection unit configured to select a certain subgroup from the extension group list, and a direct communication command unit configured to send permission information on the direct communication and configuration information on a communication environment necessary for the direct communication to the radio communication terminal contained in the subgroup selected by the subgroup selection unit. And, the radio communication terminal includes a direct communication execution unit configured to execute the direct communication based on the permission information and the configuration information received from the private branch exchange server.

A second feature of the present invention is summarized as a private branch exchange server configured to provide a communication service to a radio communication terminal being capable of executing direct communication with another radio communication terminal without involving a radio access network and belonging to an extension group, the private branch exchange server including: a transition trigger detection unit configured to detect a trigger for a transition to the direct communication; a list retention unit configured to retain an extension group list containing an identifier of the radio communication terminal belonging to the extension group; a subgroup selection unit configured to select a certain subgroup from the extension group list; and a direct communication command unit configured to send permission information on the direct communication and configuration information on a communication environment necessary for the direct communication to the radio communication terminal contained in the subgroup selected by the subgroup selection unit.

A third feature of the present invention is summarized as a communication method using a radio communication terminal capable of executing direct communication with another radio communication terminal without involving a radio access network, and a private branch exchange server configured to provide a communication service to the radio communication terminal belonging to an extension group via the radio access network, the method including the steps of: the private branch exchange server detecting a trigger for a transition to the direct communication; the private branch exchange server selecting a certain subgroup from an extension group list containing an identifier of the radio communication terminal belonging to the extension group; the private branch exchange server sending permission information on the direct communication and configuration information on a communication environment necessary for the direct communication to the radio communication terminal contained in the selected subgroup, and the radio communication terminal executing the direct communication based on the permission information and the configuration information received from the private branch exchange server.

BRIEF DESCRIPTION OF THE DRAWINGS

FIG. 5 is a diagram showing an example of an extension group list according to the embodiment of the present invention.

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of the Radio Communication System

Figure 1:
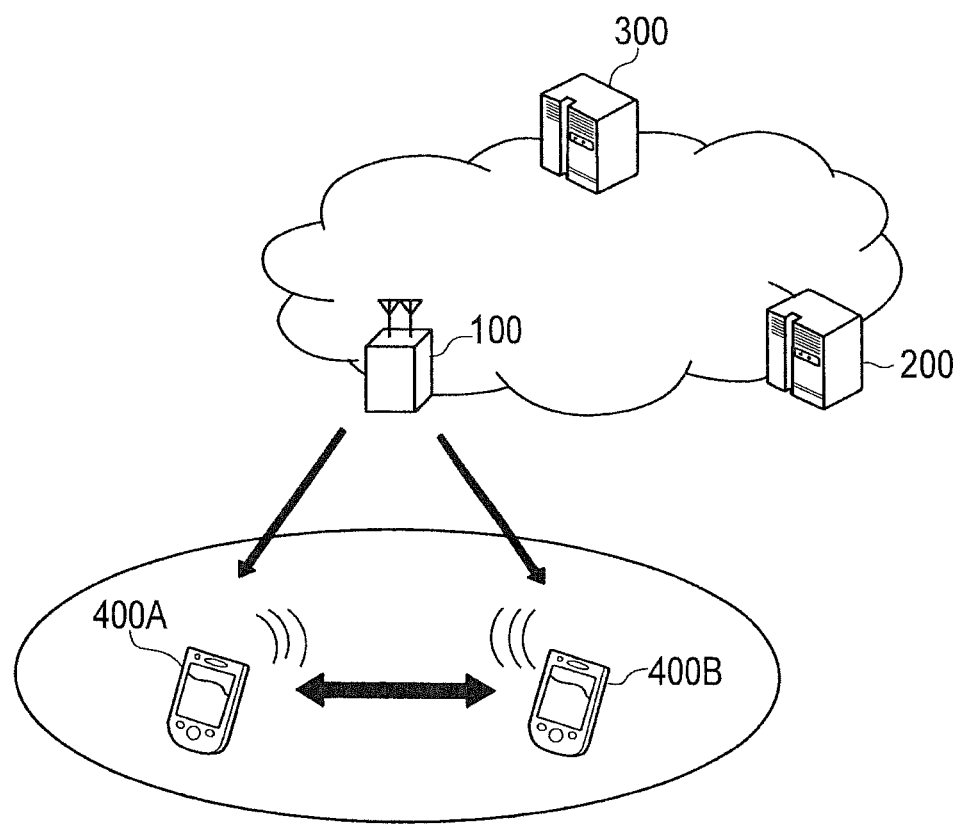
FIG. 1 is an overall schematic configuration diagram of a radio communication system 10 according to an embodiment of the present invention.

FIG. 1 is an overall schematic configuration diagram of a radio communication system 10 according to this embodiment. As shown in FIG. 1, the radio communication system 10 includes a radio base station 100, an operation system 200, a private branch exchange (PBX) server 300, and multiple radio communication terminals 400A, 400B (terminals 400A, 400B hereinbelow).

The radio base station 100 performs operation conforming to a radio access technology (RAT) standardized by 3GPP, e.g., Long Term Evolution (LTE). In this embodiment, the radio base station 100 controls direct communication between the terminals 400A, 400B. More specifically, the radio base station 100 controls the direct communication by causing the radio base station 100 to transmit broadcast information indicating whether or not to permit communication to be performed between the terminal 400A and the terminal 400B without involving the radio base station 100, i.e. without involving the radio access network. Note that the broadcast information for controlling direct communication between the terminal 400A and the terminal 400B may be broadcasted separately from multiple radio base stations, e.g., the radio base station 100 and another radio base station (not shown).

In this way, in the radio communication system 10, direct communication between the terminal 400A and the terminal 400B is permitted based on the broadcast information from the radio access network side. In addition, when it is based on broadcast information from another radio base station (not shown), for example, direct communication may be permitted based on the broadcast information from the other radio base station even in an area not covered by the radio base station 100.

The operation system 200 performs operation and maintenance of a radio access network including the radio base station 100 and of a core network connected to the radio access network. In this embodiment particularly, the operation system. 200 detects congestion in the radio access network, the core network, or the private branch exchange server 300, and notifies the private branch exchange server 300 of occurrence of congestion influential on an extension service.

The private branch exchange server 300, which is operated by a telecommunication carrier, manages terminals belonging to an extension group. Specifically, the private branch exchange server 300 controls communication between terminals belonging to an extension group. In particular, the private branch exchange server 300 can control direct communication which a terminal (e.g., the terminal 400A) and another radio communication terminal (the terminal 400B) belonging to an extension group perform with each other without involving the radio access network and the private branch exchange server 300. In this embodiment, the terminals 400A, 400B and the private branch exchange server 300 configure a private branch exchange system.

The private branch exchange server 300 may include functional elements such as, for example, a mobility control apparatus (MME), a policy control apparatus (PCRF), and subscriber management server (HSS). Alternatively, the mobility control apparatus (MME), the policy control apparatus (PCRF), or the subscriber management server (HSS) may include the functionality of the private branch exchange server 300.

The terminal 400A and the terminal 400B are each a User Equipment (UE) configured to perform radio communication conforming to a radio access technology such as LTE. The terminals 400A, 400B belong to an extension group, and perform extension as controlled by the private branch exchange server 300.

Further, the terminal 400A (400B) can communicate with the terminal 400B (400A) via the radio base station 100 and can directly communicate with the terminal 400B (400A) without involving the radio base station 100. Specifically, the terminals 400A, 400B determine based on the broadcast information broadcasted by the radio base station 100 whether direct communication can be performed or not, and perform direct communication at a predetermined timing or any timing. Note that, for this determination, information notified of by the private branch exchange server 300 (e.g., direct-communication permission notification) may be added as an element of determination.

(2) Functional Block Configuration of the Radio Communication System

Figure 2:
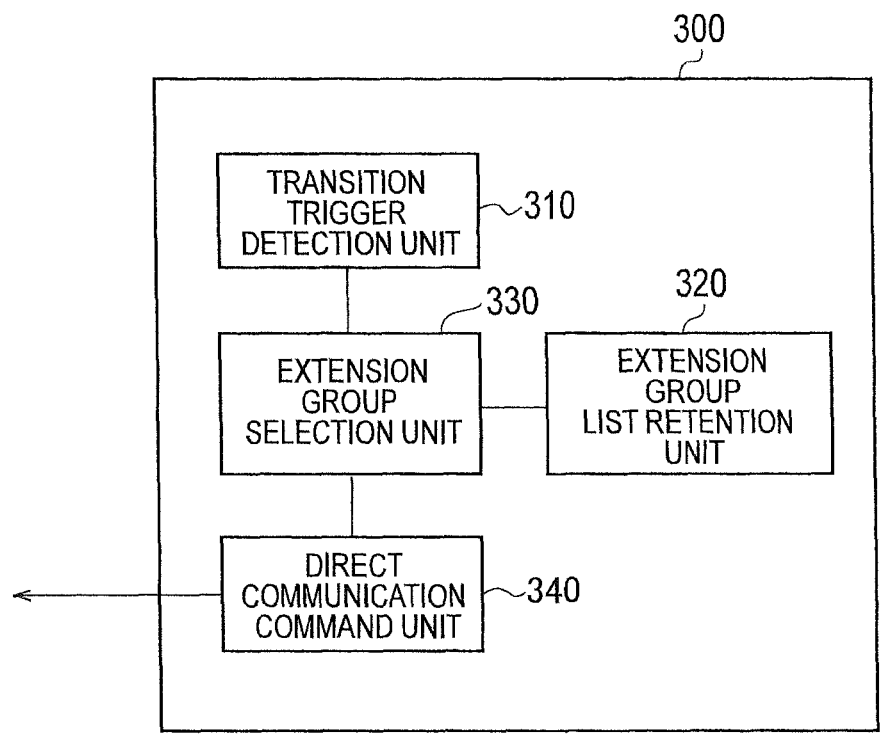
FIG. 2 is a functional block configuration diagram of a private branch exchange server 300 according to the embodiment of the present invention.
Figure 3:
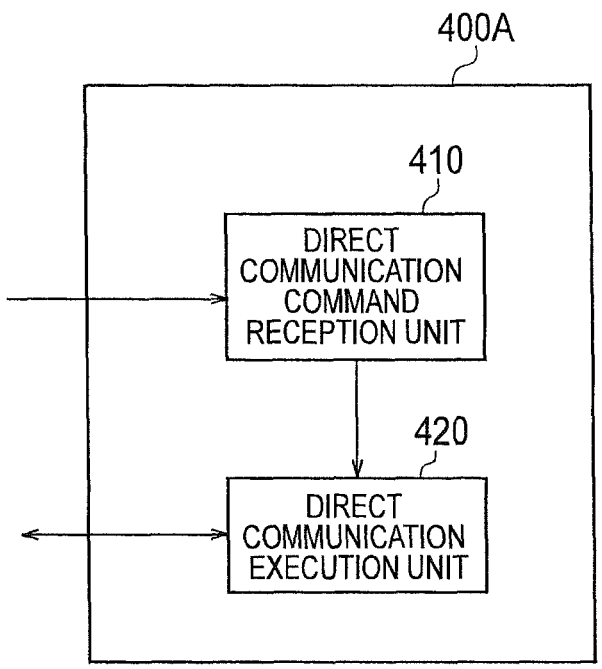
FIG. 3 is a functional block configuration diagram of a terminal 400A according to the embodiment of the present invention.

Next, a functional block configuration of the radio communication system 10 is described. Specifically, functional block configurations of the private branch exchange server 300 and the terminal 400A (400B) are described. FIG. 2 is a functional block configuration diagram of the private branch exchange server 300, and FIG. 3 is a functional block configuration diagram of the terminal 400A.

(2.1) Private Branch Exchange Server 300

As shown in FIG. 2, the private branch exchange server 300 includes a transition trigger detection unit 310, an extension group list retention unit 320, a subgroup selection unit 330, and a direct communication command unit 340.

The transition trigger detection unit 310 detects a trigger for the terminals 400A, 400B to transition from extension communication involving the private branch exchange server 300 to direct communication not involving the radio base station 100. Specifically, the transition trigger detection unit 310 extracts an extension group capable of direct communication, upon receipt of a notification of congestion of the radio access network or the like from the operation system 200. The transition trigger detection unit 310 determines that terminals belonging to the extracted extension group should transition to direct communication from extension communication involving the private branch exchange server 300, which is currently taking place or takes place after the above trigger detection.

Note that the transition trigger detection unit 310 may determine that a transition should be made from extension communication to direct communication based not only on the congestion notification from the operation system 200, but also on other trigger. For example, the transition trigger detection unit 310 can determine that a transition should be made to direct communication when a predetermined time comes or when a failure is detected in a device constituting the radio access network.

The extension group list retention unit 320 retains an extension group list containing identifiers of terminals belonging to the extension group. Specifically, the extension group list retention unit 320 retains an extension group list like the one shown in FIGS. 5(a) and 5(b).

FIGS. 5(a) and 5(b) show an example of an extension group list. FIG. 5(a) shows a list constituted by multiple subgroups (Tokyo head office, Osaka branch office, Hiroshima branch office, and Fukuoka branch office) of the same extension group (e.g., the same company). These subgroups are groups determined by logical conditions (offices of a company in the example shown in FIG. 5(a)).

FIG. 5(b) shows a list constituted by identifies (such as telephone numbers) of terminals belonging to the above extension group. This list is constituted by user names and identifiers (telephone numbers) of the terminals. Note that the identifiers of the terminals may be, besides the telephone numbers, URIs (email addresses, SIP URIs), IMEIs (terminal identification numbers), IMSIs (subscriber identification numbers), S-TMSIs (temporary subscriber identification numbers), or other information which can be used to uniquely identify the terminals.

The subgroup selection unit 330 selects a certain subgroup from the extension group list. Specifically, the subgroup selection unit 330 selects a subgroup which is to transition to direct communication. The subgroup selection unit 330 may select any subgroup (e.g., Fukuoka branch office) or a particular subgroup according to a predetermined condition (such as a priority level).

The direct communication command unit 340 sends permission information on direct communication and configuration information on a communication environment necessary for direct communication to the terminals contained in the subgroup selected by the subgroup selection unit 330. The configuration information can contain a radio frequency band used for direct communication or a radio field intensity for sending radio signals, an identifier (a telephone number, a terminal identifier, and a subscriber identifier) of a counterpart (terminating) terminal, and the like. Note that the above information can be sent to the terminals on an individual or subgroup basis or can be broadcasted to a particular area, targeting only terminals capable of direct communication.

The direct communication command unit 340 may include, in the permission information on direct communication, identifiers or the like of the terminals (users) belonging to the same subgroup.

(2.2) Terminal 400A

As shown in FIG. 3, the terminal 400A includes a direct communication command reception unit 410 and a direct communication execution unit 420. Note that the terminal 400B has a similar functional block configuration to that of the terminal 400A.

The direct communication command reception unit 410 receives a direct communication command sent by the private branch exchange server 300, or specifically, the permission information on direct communication and the configuration information on direct communication.

The direct communication execution unit 420 executes direct communication with the terminal 400B based on the direct communication command received by the direct communication command reception unit 410. Specifically, the direct communication execution unit 420 starts direct communication with the terminal 400B by sending radio signals at predetermined transmission power (radio field intensity) in a predetermined frequency band based on the configuration information on direct communication.

(3) Operation of the Radio Communication System

Next, operation of the above-described radio communication system 10 is described. Specifically, a description is given of operation where the terminal 400A executes direct communication with the terminal 400B based on a direct communication command from the private branch exchange server 300.

Figure 4:
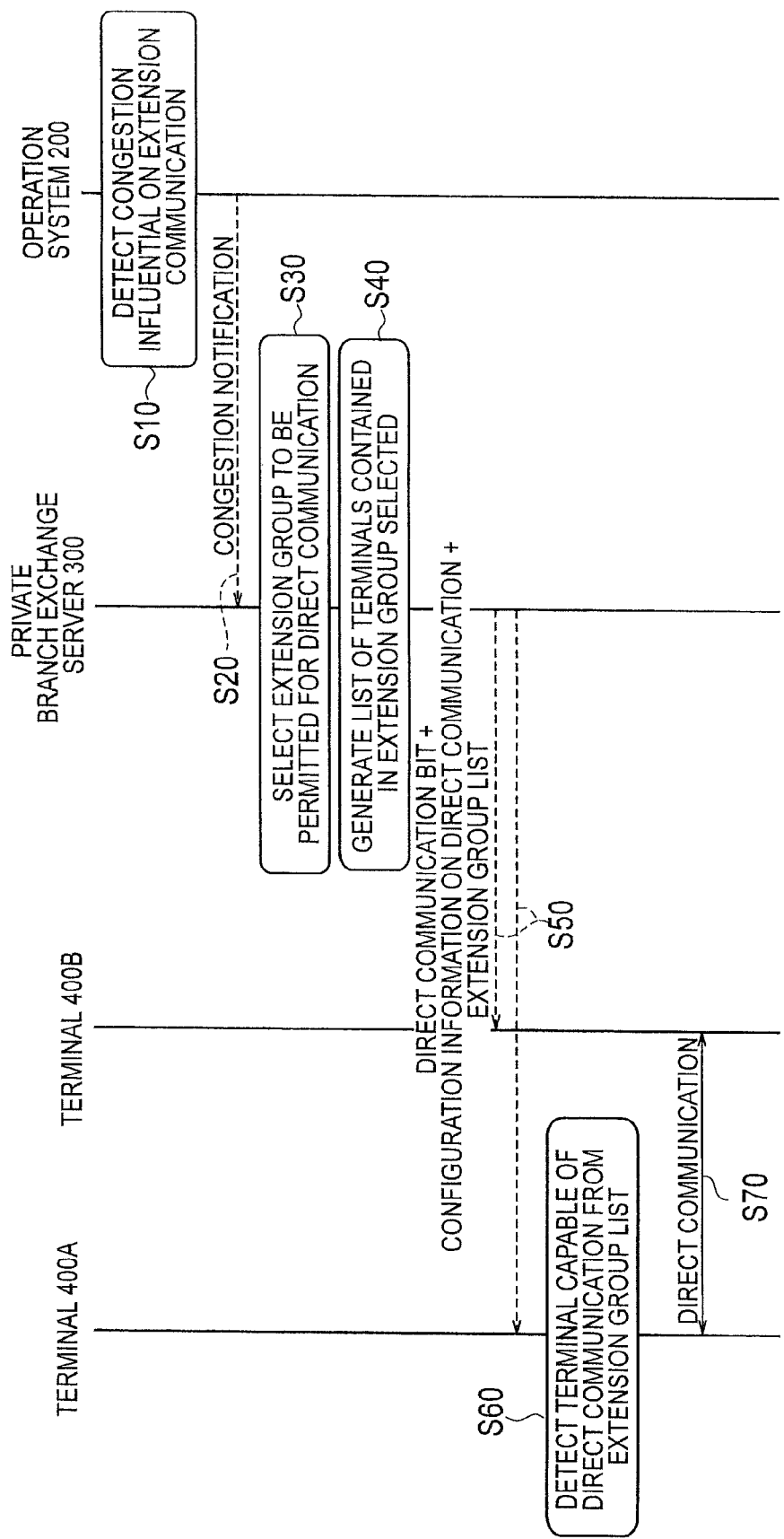
FIG. 4 is a diagram showing a communication sequence in which the terminal 400A and a terminal 400B start direct communication based on a command from the private branch exchange server 300, according to the embodiment of the present invention.

FIG. 4 shows a communication sequence in which the terminal 400A starts direct communication with the terminal 400B based on a direct communication command from the private branch exchange server 300.

As shown in FIG. 4, the operation system 200 monitors the status of the radio access network, and detects whether there is congestion influential on extension communication or not (S10). Congestion influential on extension communication is, for example, a state such as where network congestion or failure occurs between the private branch exchange server 300 and an area of an extension group managed by the private branch exchange server 300, and origination and termination of calls are restricted at both points. Upon detection of congestion or failure influential on extension communication, the operation system 200 sends a congestion notification to the private branch exchange server 300 (S20).

Based on the congestion notification from the operation system 200, the private branch exchange server 300 determines that a transition should be made from extension communication to direct communication to mitigate the congestion in the radio access network, and selects an extension group (or one or more subgroups in an extension group) permitted for direct communication (S30). Note that, as described above, a trigger for the transition from extension communication to direct communication is not limited to the congestion notification from the operation system 200.

The private branch exchange server 300 generates a list (extension group list) of terminals contained in the selected extension group (or one or more subgroups in an extension group) (S40). For instance, the private branch exchange server 300 selects "Fukuoka branch office" as the extension group (subgroup), and generates a list of terminals belonging to this subgroup (see FIG. 5(b)).

The private branch exchange server 300 sends a direct communication bit (direct communication permission notification) indicating permission for direct communication, configuration information on direct communication, and the extension group list to the terminals 400A, 400B via the radio base station 100 or other network (such as a wireless LAN) (S50). In S50, the private branch exchange server 300 may also notify of a condition for starting direct communication (such as, e.g., three-time failure in extension communication involving the network).

The terminal 400A detects a terminal capable of direct communication based on the extension group list received (S60). Specifically, in order to start communication with the terminal 400B, the terminal 400A determines whether or not the terminal 400B is in the extension group list received.

The terminal 400A sends radio signals at predetermined transmission power (radio field intensity) in a predetermined frequency band based on the configuration information on direct communication received and starts direct communication with the terminal 400B (S70).

(4) Advantageous Effects

According to the radio communication system 10, the private branch exchange server 300 sends permission information on direct communication and configuration information on direct communication to the terminals 400A, 400B contained in a selected extension group (subgroup). Then, the terminal 400A executes direct communication with the terminal 400B based on the permission information on direct communication and the configuration information on direct communication received from the private branch exchange server 300.

For this reason, terminals belonging to an extension group can perform device-to-device direct communication (D2D communication) by using a radio access network such as LTE. D2D communication can be effectively used particularly when terminals belonging to an extension group preferentially use D2D communication or when the private branch exchange server 300 has a failure or is congested.

More specifically, when a company uses an extension service, terminals in the same extension group (trigger) are concentrated in a particular area (an office of the company) and are therefore likely to be located in an area where direct communication is possible. For this reason, in cases such as where a radio access network, a core network, or the private branch exchange server 300 is congested or has a failure or where a core network between a particular area and the private branch exchange server 300 is congested, a particular extension group can be permitted for D2D communication. Thus, under the initiative of a telecommunications carrier, control can be made as to whether D2D communication can be executed between terminals belonging to the extension group or not.

(5) Other Embodiment

As described above, the details of the present invention have been disclosed by using the embodiment of the present invention. However, it should not be understood that the description and drawings which constitute part of this disclosure limit the present invention. From this disclosure, various alternative embodiments will be easily found by those skilled in the art.

For example, although the private branch exchange server 300 sends the configuration information on direct communication in the above embodiment, the radio base station 100 may send the configuration information.

In addition, although the operation system 200 detects congestion of the radio access network and the core network in the above embodiment, direct communication may be permitted when the private branch exchange server 300 detects the congestion of the private branch exchange server 300 itself.

As described above, the present invention naturally includes various embodiments which are not described herein. Accordingly, the technical scope of the present invention should be determined only by the matters to define the invention in the scope of claims regarded as appropriate based on the description.

The features of the present invention may also be expressed as follows. A first feature of the present invention is summarized as a private branch exchange system including: a terminal 400A (a radio communication terminal) capable of executing direct communication with a terminal 400B (another radio communication terminal) without involving a radio access network; and a private branch exchange server 300 configured to provide a communication service via the radio access network to the radio communication terminal belonging to an extension group. Here, the private branch exchange server includes a transition trigger detection unit 310 configured to detect a trigger for a transition to the direct communication, an extension group list retention unit 320 configured to retain an extension group list containing an identifier of the radio communication terminal belonging to the extension group, a subgroup selection unit 330 configured to select a certain subgroup from the extension group list, and a direct communication command unit 340 configured to send permission information on the direct communication and configuration information on a communication environment necessary for the direct communication to the radio communication terminal contained in the subgroup selected by the subgroup selection unit. And the radio communication terminal includes a direct communication execution unit 420 configured to execute the direct communication based on the permission information and the configuration information received from the private branch exchange server.

A second feature of the present invention is summarized as a private branch exchange server configured to provide a communication service to a radio communication terminal being capable of executing direct communication with another radio communication terminal without involving a radio access network and belonging to an extension group, the private branch exchange server including: a transition trigger detection unit configured to detect a trigger for a transition to the direct communication; a list retention unit configured to retain an extension group list containing an identifier of the radio communication terminal belonging to the extension group; a subgroup selection unit configured to select a certain subgroup from the extension group list; and a direct communication command unit configured to send permission information on the direct communication and configuration information on a communication environment necessary for the direct communication to the radio communication terminal contained in the subgroup selected by the subgroup selection unit.

In the second feature of the present invention, from the extension group, the subgroup selection unit may select a subgroup containing the radio communication terminal capable of the direct communication.

In the second feature of the present invention, the transition trigger detection unit may detect congestion of the private branch exchange server or a network between the private branch exchange server and the radio communication terminal, and may detect a trigger for a transition to the direct communication when the congestion is occurring.

A third feature of the present invention is summarized as a communication method using a radio communication terminal capable of executing direct communication with another radio communication terminal without involving a radio access network, and a private branch exchange server configured to provide a communication service to the radio communication terminal belonging to an extension group via the radio access network, the method including the steps of: the private branch exchange server detecting a trigger for a transition to the direct communication; the private branch exchange server selecting a certain subgroup from an extension group list containing an identifier of the radio communication terminal belonging to the extension group; the private branch exchange server sending permission information on the direct communication and configuration information on a communication environment necessary for the direct communication to the radio communication terminal contained in the selected subgroup, and the radio communication terminal executing the direct communication based on the permission information and the configuration information received from the private branch exchange server.

Note that the entire content of Japanese Patent Application No. 2012-100276 (filed on Apr. 25, 2012) is incorporated by reference in the present specification.

INDUSTRIAL APPLICABILITY

According to aspects of the present invention, what can be provided are a private branch exchange system, a private branch exchange server, and a communication method capable of enabling radio communication terminals belonging to an extension group to perform device-to-device direct communication (D2D communication) by using a radio access network such as LTE.

EXPLANATION OF THE REFERENCE NUMERALS 10 radio communication system
100 radio base station
200 operation system
300 private branch exchange server
310 transition trigger detection unit
320 extension group list retention unit
330 subgroup selection unit
340 direct communication command unit
400A, 400B terminal
410 direct communication command reception unit
420 direct communication execution unit

The invention claimed is:

1. A private branch exchange system comprising:
a radio communication terminal capable of executing direct communication with another radio communication terminal without involving a radio access network; and
a private branch exchange server configured to provide a communication service via the radio access network to the radio communication terminal belonging to an extension group, wherein
the private branch exchange server includes
a transition trigger detection unit configured to detect a trigger for a transition to the direct communication,
a list retention unit configured to retain an extension group list containing an identifier of the radio communication terminal belonging to the extension group,
a subgroup selection unit configured to select a certain subgroup from the extension group list, and
a direct communication command unit configured to send permission information on the direct communication and configuration information on a communication environment necessary for the direct communication to the radio communication terminal contained in the subgroup selected by the subgroup selection unit, and
the radio communication terminal includes a direct communication execution unit configured to execute the direct communication based on the permission information and the configuration information received from the private branch exchange server.

2. A private branch exchange server configured to provide a communication service to a radio communication terminal being capable of executing direct communication with another radio communication terminal without involving a radio access network and belonging to an extension group, the private branch exchange server comprising:
a transition trigger detection unit configured to detect a trigger for a transition to the direct communication;
a list retention unit configured to retain an extension group list containing an identifier of the radio communication terminal belonging to the extension group;
a subgroup selection unit configured to select a certain subgroup from the extension group list; and
a direct communication command unit configured to send permission information on the direct communication and configuration information on a communication environment necessary for the direct communication to the radio communication terminal contained in the subgroup selected by the subgroup selection unit.

3. The private branch exchange server according to claim 2, wherein
from the extension group, the subgroup selection unit selects a subgroup containing the radio communication terminal capable of the direct communication.

4. The private branch exchange server according to claim 2, wherein
the transition trigger detection unit detects congestion of the private branch exchange server or a network between the private branch exchange server and the radio communication terminal, and detects a trigger for a transition to the direct communication when the congestion is occurring.

5. A communication method using
a radio communication terminal capable of executing direct communication with another radio communication terminal without involving a radio access network, and
a private branch exchange server configured to provide a communication service to the radio communication terminal belonging to an extension group via the radio access network, the method comprising the steps of:
the private branch exchange server detecting a trigger for a transition to the direct communication;
the private branch exchange server selecting a certain subgroup from an extension group list containing an identifier of the radio communication terminal belonging to the extension group;
the private branch exchange server sending permission information on the direct communication and configuration information on a communication environment necessary for the direct communication to the radio communication terminal contained in the selected subgroup, and the radio communication terminal executing the direct communication based on the permission information and the configuration information received from the private branch exchange server.

* * * * *